(12) United States Patent
Seneviratne et al.

(10) Patent No.: US 7,287,544 B2
(45) Date of Patent: *Oct. 30, 2007

(54) TRIPLE VALVE BLOW OUT PREVENTER

(75) Inventors: Padmasiri Daya Seneviratne, Fullerton, CA (US); Lawrence Wells, Yorba Linda, CA (US); David B. Mason, Anaheim Hills, CA (US)

(73) Assignee: Varco I/P, Inc., Orange, CA (US)

( * ) Notice: Subject to any disclaimer, the term of this patent is extended or adjusted under 35 U.S.C. 154(b) by 201 days.

This patent is subject to a terminal disclaimer.

(21) Appl. No.: 11/201,056

(22) Filed: Aug. 9, 2005

(65) Prior Publication Data

US 2006/0191679 A1  Aug. 31, 2006

Related U.S. Application Data

(63) Continuation-in-part of application No. 10/971,468, filed on Oct. 21, 2004, now Pat. No. 7,121,295.

(60) Provisional application No. 60/513,252, filed on Oct. 21, 2003.

(51) Int. Cl.
*F16L 7/00* (2006.01)

(52) U.S. Cl. ............... 137/375; 137/613; 251/315.01; 251/315.16

(58) Field of Classification Search ............... 137/375, 137/613; 251/315.01–16, 368
See application file for complete search history.

(56) References Cited

U.S. PATENT DOCUMENTS

| | | | |
|---|---|---|---|
| 1,717,425 A * | 6/1929 | Weaver | .................. 137/613 |
| 3,040,808 A | 6/1962 | Schramm et al. | |
| 3,042,066 A | 7/1962 | Wolfensperger | |
| 3,109,623 A | 11/1963 | Bryant | |
| 3,150,681 A | 9/1964 | Hansen et al. | |
| 3,180,351 A | 4/1965 | Wolfensperger | |
| 3,216,696 A | 11/1965 | Cooley et al. | |
| 4,117,694 A | 10/1978 | Belmore | |
| 5,141,018 A * | 8/1992 | Guterman | .................. 137/375 |
| 5,251,869 A | 10/1993 | Mason | |
| 5,271,427 A | 12/1993 | Berchem | |
| 5,339,864 A | 8/1994 | Carbaugh et al. | |
| 5,353,832 A | 10/1994 | Berchem | |
| 5,364,064 A | 11/1994 | Carlson et al. | |
| 5,404,905 A * | 4/1995 | Lauria | .................. 137/613 |
| 5,478,047 A | 12/1995 | Best et al. | |
| 5,507,467 A | 4/1996 | Mott | |
| 5,638,855 A | 6/1997 | Morrill | |
| 5,642,754 A | 7/1997 | Rabby | |
| 5,642,872 A | 7/1997 | Morrill | |
| 5,645,098 A | 7/1997 | Morrill | |

(Continued)

*Primary Examiner*—Eric Keasel
*Assistant Examiner*—Craig Price
(74) *Attorney, Agent, or Firm*—Christie, Parker & Hale, LLP.

(57) ABSTRACT

A triple-valve internal blow out preventer having unitary construction is provided, each valve including a tubular assembly having a central passageway with upper and lower seats mounted therein. A ball is rotatably received between the upper and lower seats and includes an external surface and a central opening, wherein the central opening may include an undercut. A protective coating may also be applied to both the external surface and the undercut of the ball to increase the durability of each of the valves.

20 Claims, 6 Drawing Sheets

U.S. PATENT DOCUMENTS

| | | | | | |
|---|---|---|---|---|---|
| 5,647,572 A | 7/1997 | Morrill | 6,435,474 B1 | 8/2002 | Williams et al. |
| 5,655,745 A | 8/1997 | Morrill | 6,516,886 B2 | 2/2003 | Patel |
| 5,806,563 A * | 9/1998 | Rabby ............ 137/613 | 6,736,207 B2 | 5/2004 | Luca et al. |
| 6,073,648 A | 6/2000 | Watson et al. | 2005/0081918 A1 | 4/2005 | Seneviratne et al. |
| 6,276,450 B1 | 8/2001 | Seneviratne | | | |

* cited by examiner

TRIPLE VALVE BLOW OUT PREVENTER

CROSS-REFERENCE TO RELATED APPLICATIONS

The current application is a continuation-in-part of U.S. patent application Ser. No. 10/971,468, filed Oct. 21, 2004, now U.S. Pat. No. 7,121,295, which claims priority from U.S. Provisional Application No. 60/513,252, filed Oct. 21, 2003, the disclosures of which are incorporated herein by reference.

FIELD OF THE INVENTION

The current invention is directed to internal blow out preventers; and more particularly to a triple valve internal blow out preventer having improved reliability and durability.

BACKGROUND OF THE INVENTION

Internal Blow Out Preventers (IBOPs) are ball valves designed to relieve pressure and prevent blow out in high pressure drilling applications. However, these blow out preventers often fail in the field due to the high velocity mud flowing down and periodic hydrostatic testing of the IBOP valve, which is often exposed to pressures up to 16,000 psi. These hydrostatic pressures apply large loads to the valves causing them to fail.

Typically, blow-out preventers have included a dual-valve configuration comprising two separate assemblies an upper and lower blow-out preventer, which each have a single blow-out preventer valve. The redundancy of two valves is required because of the very high-pressures used and the high cycle use these valves are put through as mud saver valves. Unfortunately, the seals on these valves are subject to high strain and use and are subject to frequent failure. Because a back-up valve is always required in case of failure if a single one of these valves fails either the entire unit must be replaced, or the unit must be shut-down while repairs are performed. Neither of these options is particularly appealing because of the consumption of time and money on the drill site. Unfortunately, because of size constraints in some topdrive systems inserting an additional redundant valve between the upper and lower IBOP assemblies has not been considered feasible.

Accordingly, a need exists for an improved internal blow out preventer with improved durability and redundancy.

SUMMARY OF THE INVENTION

This invention is directed to a triple valve internal blow out preventer with improved durability, and its use in drilling applications.

In one embodiment, the triple valve internal blow out preventer comprises a single body comprising three individual blow out preventer ball valves and ball valve seats contained therein.

In another embodiment, the ball valve and ball valve seat are stepped in the direction of the mud-flow such that the edge of the ball valve exposed to the mud flow is setback from the edge of the seat.

In still another embodiment, the internal blow out preventer is coated with tungsten carbide. In one such embodiment, the tungsten carbide coating is wrapped about the edge of the one of either the ball valve or the seat.

In one embodiment, each of the ball valves includes a tubular assembly having a central passageway with upper and lower seats mounted therein. A ball is rotatably received between the upper and lower seats and includes an external surface and a central opening, wherein the central opening includes an undercut. A protective coating is applied to both the external surface and the undercut.

In another embodiment, each of the ball valves includes a tubular assembly having a central passageway with upper and lower seats mounted therein. A ball is rotatably received between the upper and lower seats, and includes a central opening and an upper contacting surface that contacts a contacting surface of the upper seat. The central opening includes an upper undercut at an upper end of the ball. A protective coating is applied to both the upper contacting surface and the upper undercut of the ball.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION OF THE INVENTION

The current invention is directed to a unitary triple-valve internal blow out preventer or IBOP having increased reliability and durability.

Figure 1:
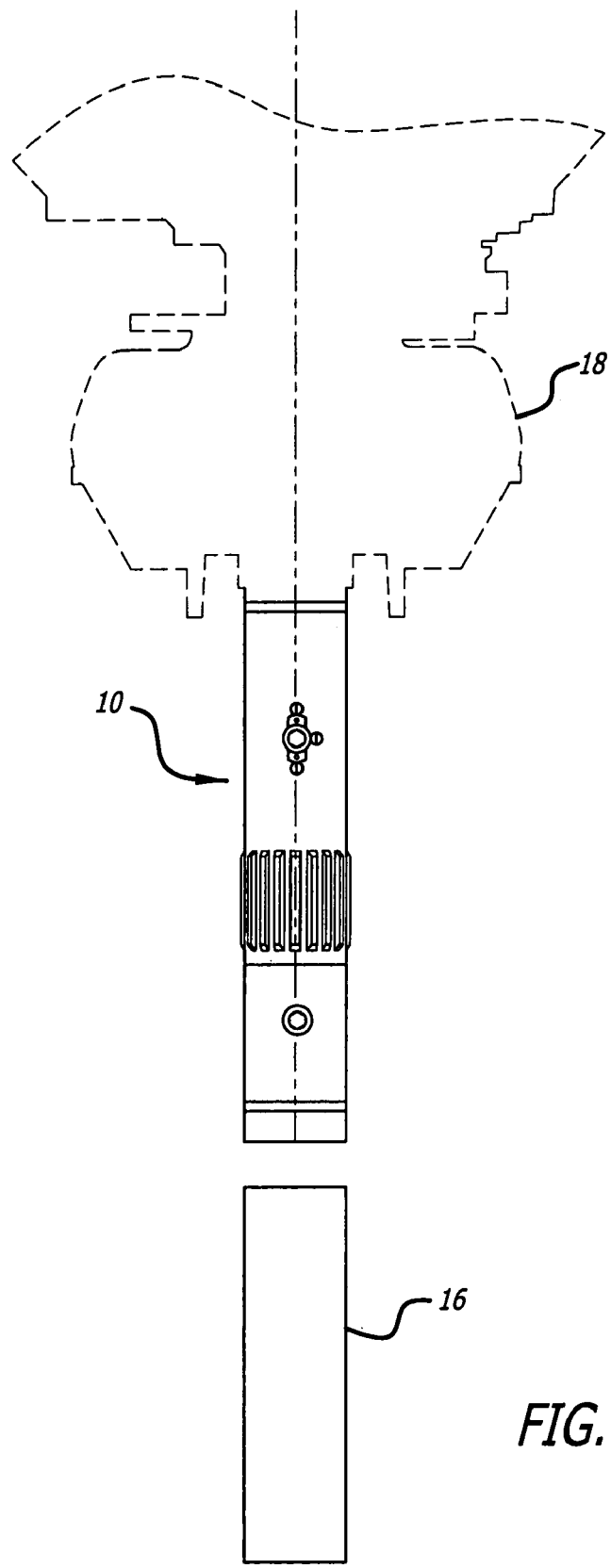
FIG. 1, is a schematic side view of an internal blow out preventer according to an exemplary embodiment of the present invention, along with a top drive system and a drill string to which the internal blow out preventer may be attached during a drilling operation.

FIG. 1 shows a triple valve internal blow out preventer 10 according to an exemplary embodiment of the present invention. The internal blow out preventer 10 provides a pressure check valve to prevent the blow out of an oil and gas well from a back pressure build-up during drilling operations. In one embodiment, the internal blow out preventer 10 is threadably connected to a drill string 16, and is driven by a top drive system 18 during a drilling operation.

Figure 2A:
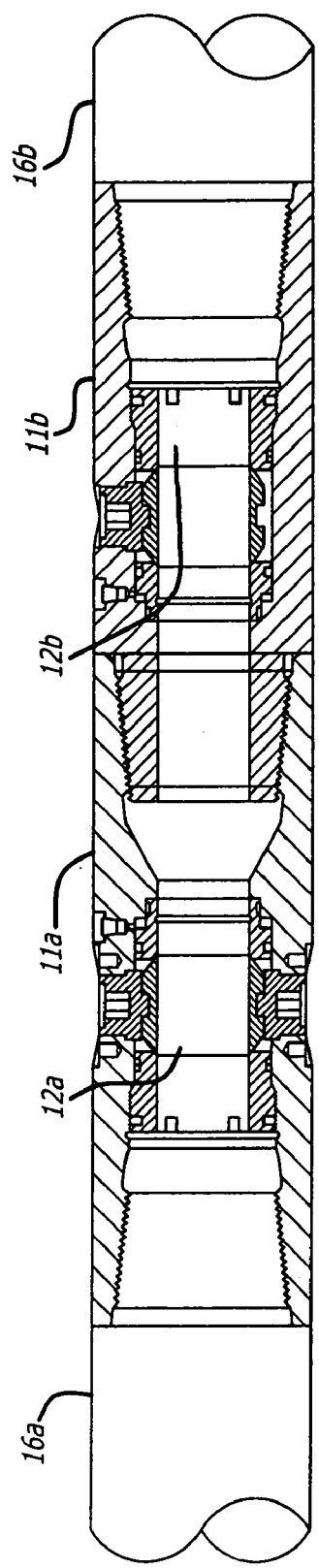
FIG. 2a, is a cross-sectional view of an embodiment of a conventional dual-valve internal blow out preventer.

As shown in FIG. 2a, a conventional IBOP comprises two separate assemblies, an upper 11a and lower 11b tubular assembly, each having a single blow-out preventer valve 12a and 12b disposed therein. These assemblies can each be threadably attached in line with suitable tubulars 16a and 16b in a drilling operation.

Figure 2B:
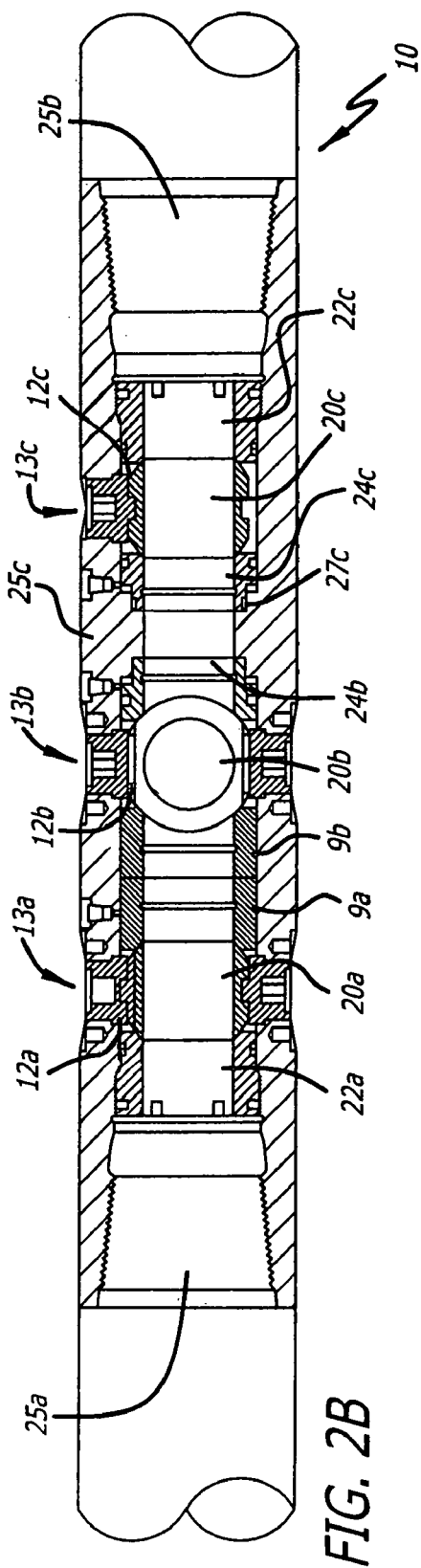
FIG. 2b, is a cross-sectional view of an embodiment of a unitary triple valve internal blow out preventer in accordance with the current invention.

In contrast, the IBOP in accordance with the current invention, as shown in FIG. 2b, is designed to provide a unitary triple-valve pressure relief assembly 10 to prevent the blow out of the well from a back pressure build-up during drilling. In the embodiment shown in FIG. 2b, the triple-valve blow-out preventer of the current invention is shown in cross-section. As shown, the assembly 10 includes three ball valves 12a to 12c set in series for diverting pressurized flow in a blow out situation, arranged and rotatably retained in a corresponding ball seat 13a to 13c. Although a single unitary body is used to retain all three of the valves, for clarity we will divide the body into an upper portion 25a and a lower portion 25b separated by a metal cuff 25c. The lower portion 25b of the IBOP of the current invention contains a single valve 12c, which is formed by positioning a lower end of the lower seat 24c in abutment with a shoulder 27c of the metal cuff 25c in the lower portion 25b of the central passageway; positioning a lower end of the ball 20c in abutment with an upper end of the lower seat 24c; and placing a lower end of the upper seat 22c in abutment with an upper end of the ball 20c. In one embodiment, the upper seat 22c includes threads 21c that threadably engage threads 22c in the the central passageway of the valve assembly 12c in order to prevent vertical displacement of itself, as well as the ball 20c and the lower seat 24c. Similar constructions are used for the valves 12a and 12b in the upper portion 25a of the central passageway, except that an insertable seat ring 9b is used to replace the upper seat of the lower valve 12b and a second insertable seat ring 9a is used to replace the lower seat of the upper valve 12a such that seat rings 9a and 9b directly abut one another within the upper central passageway 25a of the IBOP. Such construction allows for the removal of both the upper valves 12a and 12b in case of a breakdown.

Figure 3:
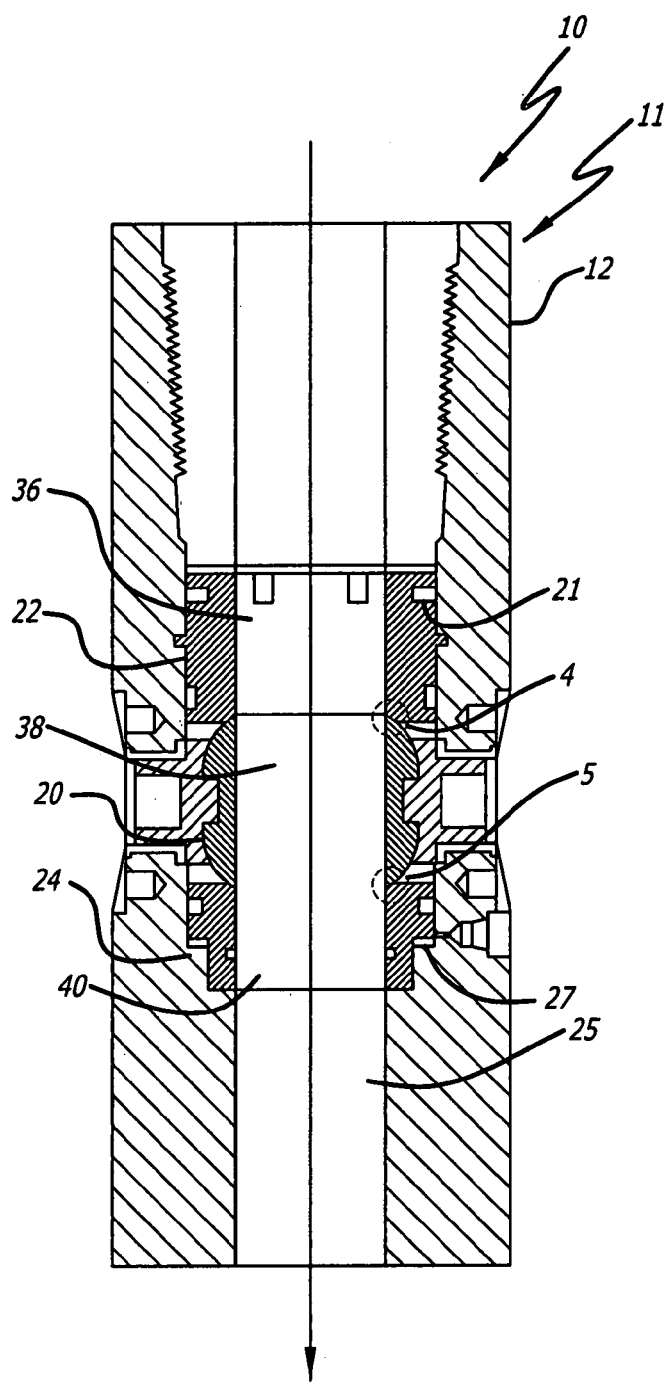
FIG. 3 is a cross-sectional view of a ball valve and seat of one embodiment of the triple valve blow out preventer shown in FIG. 2b.

Detailed views of the construction of one exemplary valve are provided in FIGS. 3 to 7. For example, FIG. 3 shows an exploded view of an exemplary ball valve in accordance with the current invention. As shown, each of the valves 12 includes a valve assembly 13 having an upper seat 22 and a lower seat 24 mounted therein. The upper seat 22 is mounted in a threaded connection 21 within the valve assembly 13, and the lower seat 24 is mounted against a shoulder 27 in the valve assembly 13. A ball 20 is rotatably received between the upper and lower seats 22 and 24. The valve assembly 13 and the upper and lower seats 22 and 24 together form each of the ball valves 12. Each of the valves 12 are mounted in a central passageway and each of the ball 20 and seats 22 and 24 of the valves 12 each have central openings 36, 38 and 40 axially aligned with each other and with the longitudinal axis of the central passageway 25. As shown by the arrow, during operation, when all valves are open, drilling mud flows downwardly through each of the valve openings 36, 38 and 40 creating a mud flow bath through the IBOP.

Figure 4:
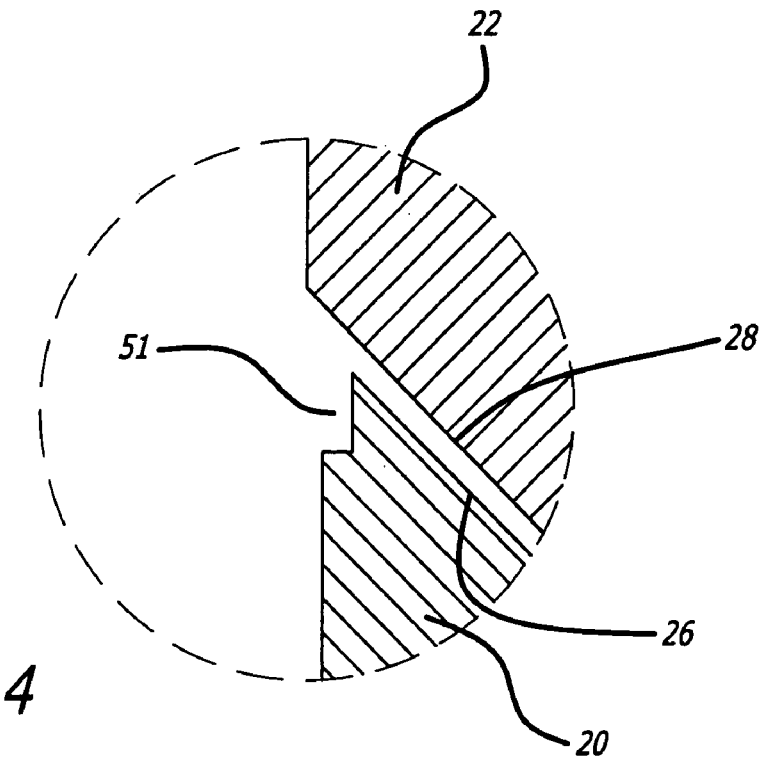
FIG. 4 is an enlarged view of contacting portions of the ball with an upper seat of the internal blow out preventer of one embodiment of the invention, with protective coatings omitted for clarity.
Figure 5:
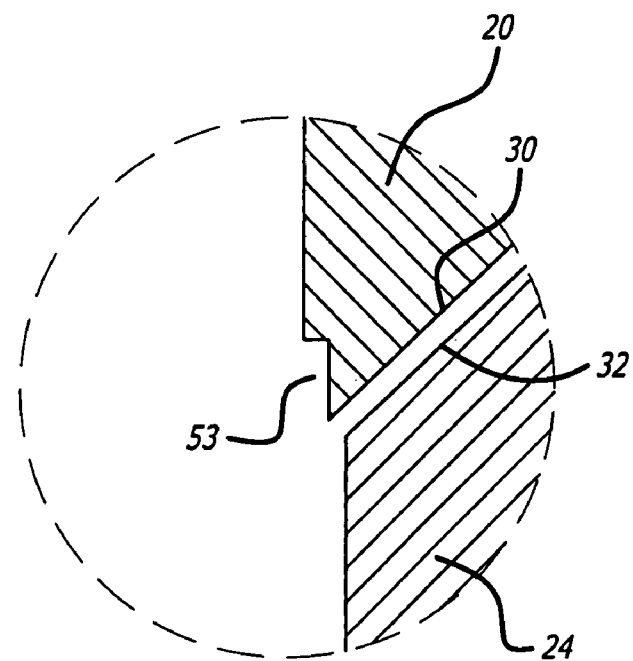
FIG. 5 is an enlarged view of contacting portions of the ball with a lower seat of the internal blow out preventer of one embodiment of the invention, with protective coatings omitted for clarity.

In order to improve the fluid flow of the drilling mud through the internal blow out preventer 10, in one embodiment shown for example in FIG. 3, the diameter of the central opening 38 in the ball 20 may also be made slightly larger than the diameter of the central opening 36 in the upper seat 22 (see FIG. 4); and the diameter of the central opening 40 in the lower seat 24 may be made slightly larger than the diameter of the central opening 38 in the ball 20 (see FIG. 5). In such an arrangement, the drilling mud is able to flow smoothly from the central opening 36 in the upper seat 22 to the slightly larger central opening 38 in the ball 20 and smoothly flow from the central opening 38 in the ball 20 to the slightly larger central opening 40 in the lower seat 24. In addition, this arrangement lessens the impact of the mud flow on the upper ball junction 50 (since the junction 50 is inset from the central opening 36 of the upper seat 22) and thereby further reduces the likelihood of the protective coating 40 peeling away at the upper ball junction 50.

In another embodiment, the IBOP design of the current invention may also include shrouded tungsten carbide edges for the ball. In this embodiment, the edges of the ball where the tungsten carbide runs out in conventional designs has been improved by wrapping the carbide coating from the spherical surface into the bore uniformly without leaving an edge. The carbide coating thus extends on both ends of the shrouding it into the bore smoothly assuring that the mud-flow does not erode and peal away the coating at a vulnerable edge. FIGS. 4 and 5 show exploded views of the contact surfaces of the seats set out in circled elements 4 and 5 of FIG. 3. As shown in FIGS. 4 and 5, with the ball 20 and seats 22 and 24 positioned as described above, the ball 20 has an upper contact surface 26 that contacts a contact surface 28 of the upper seat 22; and a lower contact surface 30 that contacts a contact surface 32 of the lower seat 34. In order to reduce wear between these surfaces, each contact surface 26, 28, 30 and 32 is coated with a protective coating (shown for example in FIG. 7, as protective coating 40). The protective coating may be applied by any appropriate coating method and the protective coating may be any coating appropriate for reducing wear. For example, in one embodiment, the protective coating is a hard protective coating such as tungsten carbide.

As described above, a problem with internal blow out preventers of the prior art is that a protective coating is applied to the external surface of the ball, but does not extend into the central opening of the ball. As a result the coating often peels off of the ball valve at the junction of the external surface of the ball and the central opening of the ball. As show in FIG. 6, in one embodiment according to the present invention, an undercut 51 and 53 is cut into the upper and lower ends, respectively, of the ball 20, creating a circumferential groove at each end of the ball 20. These undercuts 51 and 53 allow the protective coating 40 (as described above) to be applied to an external surface 55 of the ball 20; wrapped around the junctions 50 and 52 of the external surface 55 and the central opening 38 of the ball 20; and attached to the undercuts 51 and 53. Such an arrangement reduces the likelihood of the protective coating 40 peeling away at the junctions 50 and 52, as is problematic with the prior art.

Figure 6:
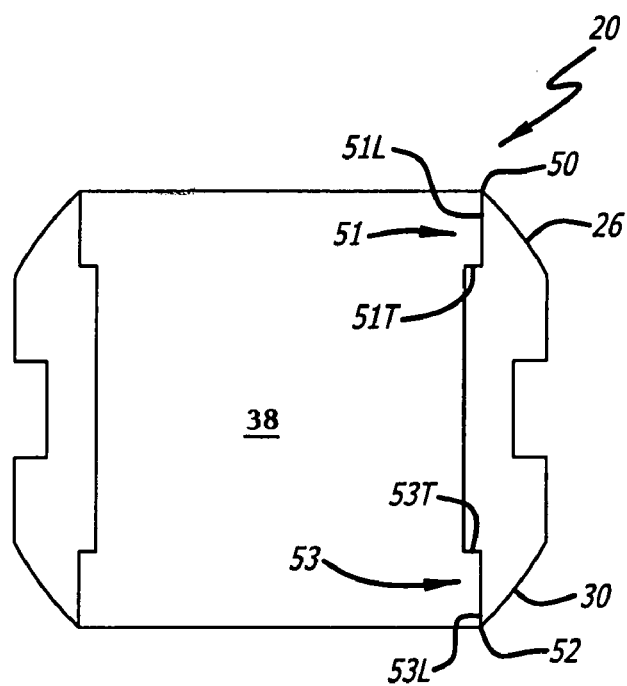
FIG. 6 is a schematic view of the ball of the internal blow out preventer of one embodiment of the invention having an undercut for receiving a protective coating, with the protective coating omitted for clarity purposes.
Figure 7:
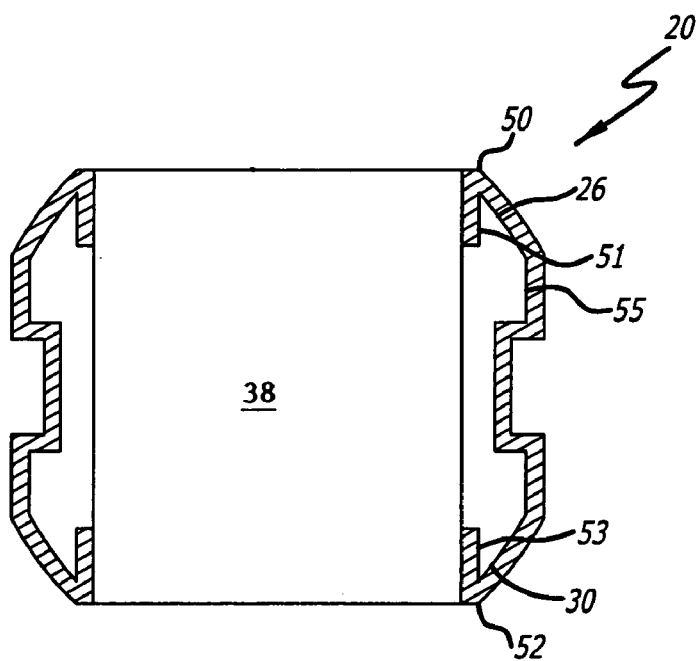
FIG. 7 is a schematic view of the ball of FIG. 6 with a protective coating attached to each of an external surface and the undercuts of the ball (note this drawing is not to scale, the protective coating is oversized for clarity purposes).

In the depicted embodiment, shown for example in FIG. 6, the undercuts 51 and 53 each include a longitudinal component 51L and 53L and a transverse component 51T and 53T. As shown, the longitudinal components 51L and 53L extend substantially parallel to the central opening 38 of the ball 20 and extend slightly inward from the central opening 38 forming a slightly larger opening than that of the central opening 38. The transverse components 51T and 53T define the depth of the undercuts 51 and 53. In a preferred embodiment, the depth of the undercuts 51 and 53 is controlled by-the desired thickness of the protective coating 40. This is due to the desirability of having the outer surface of the protective coating 40 flush with the inner surface of the central opening 38. This flush arrangement helps prevent peeling of the protective coating 40 from the undercuts 51 and 53. Merely by way of example, in one embodiment, the depth of the undercuts 51 and 53 and the thickness of the protective coating are each in the range of approximately 0.008 inches to 0.010 inches.

In addition to these improvements in the durability of the valves of the current invention, the triple valve nature of the current IBOP allows for improved reliability, because it allows for the presence of a secondary or backup mud saver valve. In short, during normal operation when all three valves are in operational condition, only two of the valves are needed for proper operation of the well—the lower IBOP valve 12c, which operates to shut off mud flow, and one of the upper IBOP valves 12a or 12b, which operates as a mud saver. However, because of the high cycle use, the seals of the upper IBOP valve 12a can wear out fairly quickly requiring removal and replacement of the upper IBOP valve, and shut down of the well. The secondary upper IBOP valve 12b of the current invention allows for a backup, such that shut down of the well is not required until both the upper IBOP, or mud saver valves wear out.

Figure 8:
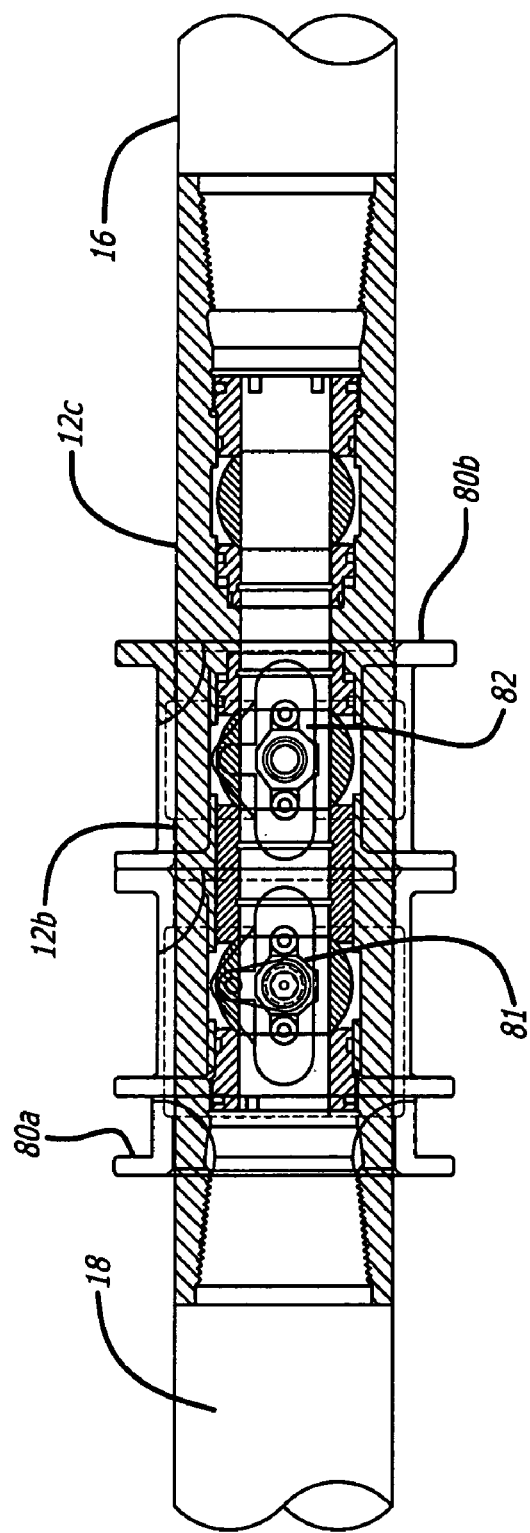
FIG. 8 is a cross-sectional view of an embodiment of a unitary triple valve internal blow out preventer incorporating an actuator in accordance with the current invention.

In order to ensure proper operation of the triple valve IBOP of the current invention, in one embodiment each of the upper IBOP valves is supplied with a separate actuator 80a and 80b. As shown in FIG. 8, the actuators for the valves are installed in one embodiment such that a pair of cranks 81 are mounted concentric to the body of a first valve 12a such that the IBOP can close and the valve. These crank in turn can be remotely controlled, such as through a hydraulic or air cylinder in signal communication to a remote controller. Because only one of the two upper IBOP valves needs to be actuated at a time for proper operation of the IBOP, the second upper IBOP valve in such an embodiment is equipped with a mechanical lock 82, such that it cannot be actuated absent being unlocked. Accordingly, when it is necessary to switch to the spare upper IBOP valve the cranks and the mechanical lock are switched and the spare or secondary upper IBOP valve becomes the remotely controllable mud saver valve.

Although specific embodiments are disclosed herein, it is expected that persons skilled in the art can and will design alternative triple-valve internal blow out preventer systems and methods that are within the scope of the following claims either literally or under the Doctrine of Equivalents.

What is claimed is:

1. A triple valve internal blow out preventer comprising:
at least three ball valves disposed in a serial arrangement within a tubular body, each ball valve comprising:
a tubular assembly comprising a central passageway; an upper seat mounted within the tubular assembly; a lower seat mounted within the tubular assembly;
a ball rotatably received between the upper and lower seats and comprising an external surface and a central opening defining a fluid passage, said fluid passage having a first diameter, and wherein the central opening further comprises an undercut portion at the junction between the external surface and the central opening, said undercut portion having a second diameter that is greater than the first diameter of the fluid passage; and
a protective coating applied to both the external surface and the central opening of the ball, and which is attached and terminates within the undercut of the ball such that coated undercut portion has a diameter that is substantially the same as the first diameter of the fluid passage.

2. The triple valve internal blow out preventer of claim 1, wherein the protective coating comprises a hard protective coating capable of reducing wear between the ball and the seats.

3. The triple valve internal blow out preventer of claim 1, wherein the protective coating comprises tungsten carbide.

4. The triple valve internal blow out preventer of claim 1, wherein the upper seat comprises a central opening axially aligned with both the central passageway of the tubular assembly and the central opening of the ball; and wherein the central opening of the ball is larger than the central opening of the upper seat.

5. The triple valve internal blow out preventer of claim 4, wherein the lower seat comprises a central opening axially aligned with both the central passageway of the tubular assembly and the central opening of the ball; and wherein the central opening of the lower seat is larger than the central opening of the ball.

6. The triple valve internal blow out preventer of claim 1, wherein the undercut is in the upper end of the ball.

7. The triple valve internal blow out preventer of claim 6, further comprising a lower undercut portion at the junction of the external surface and the central opening in the lower end of the ball, and wherein the protective coating is applied to the external surface and both ends of the central opening such that the protective coating is attached and terminates in both the upper undercut and the lower undercut of the ball such that coated undercut portions have a diameter that is substantially the same as the first diameter of the fluid passage.

8. The triple valve internal blow out preventer of claim 1, wherein each ball valve further comprises an actuator for opening and closing the valve.

9. The triple valve internal blow out preventer of claim 8, wherein each of the actuators is automated.

10. The triple valve internal blow out preventer of claim 9, wherein the actuators are remotely controlled via one of either a hydraulic or pressurized air controller.

11. The triple valve internal blow out preventer of claim 8, wherein each of the actuators may be mechanically locked to prevent remote actuation.

12. A triple valve internal blow out preventer comprising:
at least three ball valves disposed in a serial arrangement within a tubular body, each ball valve comprising:
a tubular assembly comprising a central passageway;
an upper seat mounted in the central passageway of the tubular assembly;
a lower seat mounted in the central passageway of the tubular assembly;
a ball rotatably received between the upper and lower seats, and comprising a central opening defining a fluid passage, said fluid passage having a first diameter, and an upper contacting surface that contacts a contacting surface of the upper seat, and wherein the central opening comprises an upper undercut portion at the junction between the upper contacting surface and the central opening, said undercut portion having a second diameter that is greater than the first diameter of the fluid passage, said undercut portion being disposed at an upper end of the ball; and
a protective coating applied to the upper contacting surface and the central opening such that the protective coating is attached and terminates in the upper undercut of the ball such that the coated undercut portion has a diameter that is substantially the same as the first diameter of the fluid passage.

13. The triple valve internal blow out preventer of claim 12, wherein the protective coating comprises a hard protective coating capable of reducing wear between the ball and the seats.

14. The triple valve internal blow out preventer of claim 12, wherein the protective coating comprises tungsten carbide.

15. The triple valve internal blow out preventer of claim 12, wherein the upper seat comprises a central opening axially aligned with both the central passageway of the tubular assembly and the central opening of the ball; and wherein the central opening of the ball is larger than the central opening of the upper seat.

16. The triple valve internal blow out preventer of claim 15, wherein the lower seat comprises a central opening axially aligned with both the central passageway of the tubular assembly and the central opening of the ball; and wherein the central opening of the lower seat is larger than the central opening of the ball.

17. The triple valve internal blow out preventer of claim 12, wherein the ball comprises a lower contacting surface that contacts a contacting surface of the lower seat; and wherein the central opening comprises a lower undercut portion at the junction of the lower contacting surface and the central opening at a lower end of the ball; and wherein the protective coating is applied to each of the upper and lower contacting surfaces and the central opening such that the protective coating is attached and terminates in the upper and lower undercuts of the ball such that coated undercut portions have a diameter that is substantially the same as the first diameter of the fluid passage.

18. A triple valve internal blow out preventer comprising:
at least three ball valves disposed in a serial arrangement within a tubular body, comprising:
a first ball valve comprising:
a first tubular assembly comprising a central passageway;
a first upper seat mounted in the central passageway of the first tubular assembly;
a first lower seat mounted in the central passageway of the first tubular assembly;
a first ball rotatably received between the first upper and lower seats, and comprising a central opening defining a fluid passage, said fluid passage having a first diameter, and an upper contacting surface that contacts a contacting surface of the first upper seat, and wherein the central opening includes an upper undercut portion at the junction between the upper contacting surface and the central opening, said undercut portion having a second diameter that is greater than the first diameter of the fluid passage, said undercut portion being disposed at an upper end of the first ball; and
a first protective coating applied to both the upper contacting surface and the central opening such that the protective coating is attached and terminates in the upper undercut of the first ball such that the coated undercut portion has a diameter that is substantially the same as the first diameter of the fluid passage; and a second ball valve comprising:
a second tubular assembly threadably connected to the first tubular assembly and comprising a central passageway;
a second upper seat mounted in the central passageway of the second tubular assembly;
a second lower seat mounted in the central passageway of the second tubular assembly;
a second ball rotatably received between the second upper and lower seats, and comprising a central opening defining a fluid passage, said fluid passage having a first diameter, and an upper contacting surface that contacts a contacting surface of the second upper seat, and wherein the central opening includes an upper undercut portion at the junction between the upper contacting surface and the central opening, said undercut portion having a second diameter that is greater than the first diameter of the fluid passage, said undercut portion being disposed at an upper end of the second ball; and
a second protective coating applied to both the upper contacting surface and the central opening such that the protective coating is attached and terminates in the upper undercut of the second ball such that the coated undercut portion has a diameter that is substantially the same as the first diameter of the fluid passage,
a third ball valve comprising:
a third tubular assembly threadably connected to the first tubular assembly and comprising a central passageway;
a third upper seat mounted in the central passageway of the second tubular assembly;
a third lower seat mounted in the central passageway of the second tubular assembly;
a third ball rotatably received between the second upper and lower seats, and comprising a central opening defining a fluid passage, said fluid passage having a first diameter, and an upper contacting surface that contacts a contacting surface of the second upper seat, and wherein the central opening includes an upper undercut portion at the junction between the upper contacting surface and the central opening, said undercut portion having a second diameter that is greater than the first diameter of the fluid passage, said undercut portion being disposed at an upper end of the second ball; and
a third protective coating applied to both the upper contacting surface and the central opening such that the protective coating is attached and terminates in the upper undercut of the third ball such that the coated undercut portion has a diameter that is substantially the same as the first diameter of the fluid passage.

19. The triple valve internal blow out preventer of claim 18, wherein the first and second protective coatings each comprise a hard protective coating capable of reducing wear between the ball and the seats.

20. The triple valve internal blow out preventer of claim 18, wherein the first and second protective coatings each comprise tungsten carbide.

* * * * *

UNITED STATES PATENT AND TRADEMARK OFFICE
CERTIFICATE OF CORRECTION

PATENT NO. : 7,287,544 B2
APPLICATION NO. : 11/201056
DATED : October 30, 2007
INVENTOR(S) : Padmasiri Daya Seneviratne et al.

It is certified that error appears in the above-identified patent and that said Letters Patent is hereby corrected as shown below:

| | |
|---|---|
| Column 1, line 30 | After "assemblies", Insert --,-- |
| Column 1, line 44 | After "systems", Insert --,-- |
| Column 3, line 58 | After "12" Delete "each" |
| Column 3, line 59 | Before "axially", Insert --are-- |
| Column 4, line 22 | After "shrouding", Delete "it" |
| Column 4, line 22 | After "bore", Insert --,-- |
| Column 4, line 67 | After "by", Delete "-" |
| Column 5, line 31 | After "close", Delete "and" |
| Column 6, line 1, claim 1 | After "that", Insert --the-- |
| Column 6, line 31, claim 7 | After "that", Insert --the-- |

UNITED STATES PATENT AND TRADEMARK OFFICE
CERTIFICATE OF CORRECTION

| | |
|---|---|
| PATENT NO. | : 7,287,544 B2 |
| APPLICATION NO. | : 11/201056 |
| DATED | : October 30, 2007 |
| INVENTOR(S) | : Padmasiri Daya Seneviratne et al. |

It is certified that error appears in the above-identified patent and that said Letters Patent is hereby corrected as shown below:

Column 7, line 31, claim 17     After "that", Insert --the--

Signed and Sealed this

Twelfth Day of August, 2008

JON W. DUDAS
*Director of the United States Patent and Trademark Office*